United States Patent
Parsons

(10) Patent No.: US 6,412,612 B1
(45) Date of Patent: Jul. 2, 2002

(54) PARK AND SERVICE BRAKE ARRANGEMENTS

(75) Inventor: Francis Edward Parsons, North Geelong (AU)

(73) Assignee: Brake Technologies Pty Ltd., Victoria (AU)

( * ) Notice: Subject to any disclaimer, the term of this patent is extended or adjusted under 35 U.S.C. 154(b) by 0 days.

(21) Appl. No.: 09/242,023

(22) PCT Filed: Aug. 6, 1997

(86) PCT No.: PCT/AU97/00500

§ 371 (c)(1),
(2), (4) Date: May 25, 1999

(87) PCT Pub. No.: WO98/05879

PCT Pub. Date: Feb. 12, 1998

(30) Foreign Application Priority Data

Aug. 6, 1996 (AU) .............................. PO 1442

(51) Int. Cl.⁷ .............................................. F16D 65/24
(52) U.S. Cl. ...................... 188/170; 188/72.5; 188/73.2
(58) Field of Search ................................ 188/170, 72.4, 188/72.5, 72.1, 72.3, 73.2, 366, 367, 368, 369, 106 P, 106 R

(56) References Cited

U.S. PATENT DOCUMENTS

| 2,684,742 A | * | 7/1954 | Eason ...................... 192/91 A |
| 3,954,304 A | | 5/1976 | Engle |
| 3,974,896 A | * | 8/1976 | Rach ......................... 188/170 |
| 4,014,414 A | | 3/1977 | Yamamoto et al. |
| 4,018,140 A | | 4/1977 | Engle |
| 4,615,418 A | * | 10/1986 | Atwell ....................... 188/170 |
| 4,805,744 A | | 2/1989 | Pringle ...................... 188/71.5 |
| 5,620,063 A | * | 4/1997 | Smith ........................ 188/73.2 |
| 6,089,357 A | * | 7/2000 | Jackson et al. ............ 188/71.6 |

FOREIGN PATENT DOCUMENTS

| CA | 1043712 | 12/1978 |
| DE | 42 10 828 A1 | 11/1992 |
| EP | 0 070 106 | 1/1983 |
| FR | 2 521 506 | 2/1982 |
| GB | 1250579 | 10/1971 |
| WO | WO 83/03124 | 9/1983 |

* cited by examiner

Primary Examiner—Paul N. Dickson
Assistant Examiner—Xuan Lan Nguyen
(74) Attorney, Agent, or Firm—Banner & Witcoff, Ltd

(57) ABSTRACT

A brake assembly capable of providing a park/emergency brake facility and a service brake facility acting on the same friction pad or friction pad pair. The assembly includes a rotatable disc rotor, and at least one friction pad adapted for movement towards a braking surface of the disc rotor to provide a braking effect. The assembly further includes a first brake activating means to provide the park/emergency brake facility operable selectively to urge said one friction pad towards the braking surface of the disc rotor, a second brake activating means to provide a service brake facility selectively operable independently of the first brake activating means to urge the one friction pad towards the braking surface of the disc rotor. A third means normally acts to prevent the first brake activating means from urging the one friction pad towards the braking surface of the disc rotor.

11 Claims, 4 Drawing Sheets

PARK AND SERVICE BRAKE ARRANGEMENTS

INTRODUCTION

The present invention relates to improvements in brake assemblies particularly for use in machine and motor vehicle applications.

BACKGROUND OF THE INVENTION

There is an increasing worldwide concern for improved standards of machine and motor vehicle operating safety as well as the prevention of environmental damage. These concerns have highlighted problems with conventional "open-to-atmosphere" brakes. An enclosed fluid immersed brake arrangement as disclosed, for example, in Australian Patent No. 659227 and International Patent Application No. PCT/AU95/00529 has provided an answer to many of these concerns. The brake configurations disclosed in these earlier patent applications utilise conventional pot type cylinders in conventional calliper arrangements. One drawback, however, with pot style cylinders is that they do not lend themselves for convenient layout designs for high torque/small diameter brakes of 300 mm or smaller, or to larger diameter high torque brakes of 400 mm or larger. In the past, annular cylinder designs have been utilised to satisfy the high torque small diameter and larger diameter brake calliper applications. A drawback to the utilisation of such annular cylinder brakes has been that an annular piston arrangement has only been offered as either a hydraulic apply brake or a spring apply hydraulic brake. The former arrangements being unsuitable as a park brake and the latter having drawbacks when utilised as a service brake. A further disadvantage associated with annular cylinder brakes is the difficulties associated with manufacturing same and a requirement for symmetrical placement of the brake pad sets.

An objective therefore is to provide a brake arrangement which will overcome or minimise the drawbacks associated with current brake arrangements. A particularly preferred objective of the present invention is to provide a brake arrangement for an enclosed fluid immersed brake configuration as shown in International Patent Application No. PCT/AU95/00529 which will provide an effective park/emergency braking facility and a service brake facility.

SUMMARY

Accordingly, the present invention provides a brake arrangement including a rotatable disc rotor, at least one friction pad adapted for movement towards a braking surface of the disc rotor to provide a braking effect thereon, first brake activating means to provide a park/emergency brake facility operable selectively to urge said one friction pad towards said braking surface of the disc rotor, and second brake activating means to provide a service brake facility selectively operable independently of said first brake activating means to urge said one friction pad towards said braking surface of the disc rotor.

According to a further aspect, the present invention provides a brake arrangement including a rotatable disc rotor, at least one friction pad adapted for movement towards a braking surface of the disc rotor to provide a braking effect thereon, first brake activating means to provide a park/emergency brake facility operable selectively to urge said one friction pad towards braking surface of the disc rotor, second brake activating means to provide a service brake facility selectively operable independently of said first brake activating means to urge said one friction pad towards said braking surface of the disc rotor, and third means normally acting to prevent said first brake activating means from urging said one friction pad towards said braking surface of the disc rotor. One, two or more said friction pads are provided at circumferentially spaced locations around said rotatable disc rotor, at least two and preferably all of said friction pads being moved simultaneously and selectively by either said first or second brake activating means.

Conveniently, said first brake activating means is adapted to provide a substantially constant force which is transmitted to said at least one friction pad unless countered by said third means. Preferably the substantially constant force provided by said first brake activating means is provided by spring means acting on a piston. Preferably, said second brake activating means includes a pressurised hydraulic fluid selectably supplied to a first piston means arranged to transmit an urging force to said at least one friction pad. Preferably, said third means includes a pressurised hydraulic fluid selectably supplied to a second piston means to produce a counter force to the spring force applied by the spring means to said second piston means. In one preferred embodiment, said first piston means includes an annular piston. In this preferred embodiment the second piston means may also be an annular piston. In a second preferred embodiment, said first piston means may be formed by one or more individual cylinders. In this embodiment, the second piston means may also be formed by one or more individual cylinders. Conveniently, said second piston means is comprised by individual cylinders located on either side of a central cylinder for said first piston means.

BRIEF DESCRIPTION OF THE DRAWINGS

Several practical preferred embodiments of the present invention will hereinafter be described with reference to the accompanying drawings in which.

DETAILED DESCRIPTION OF PREFERRED EMBODIMENTS

Figure 1:
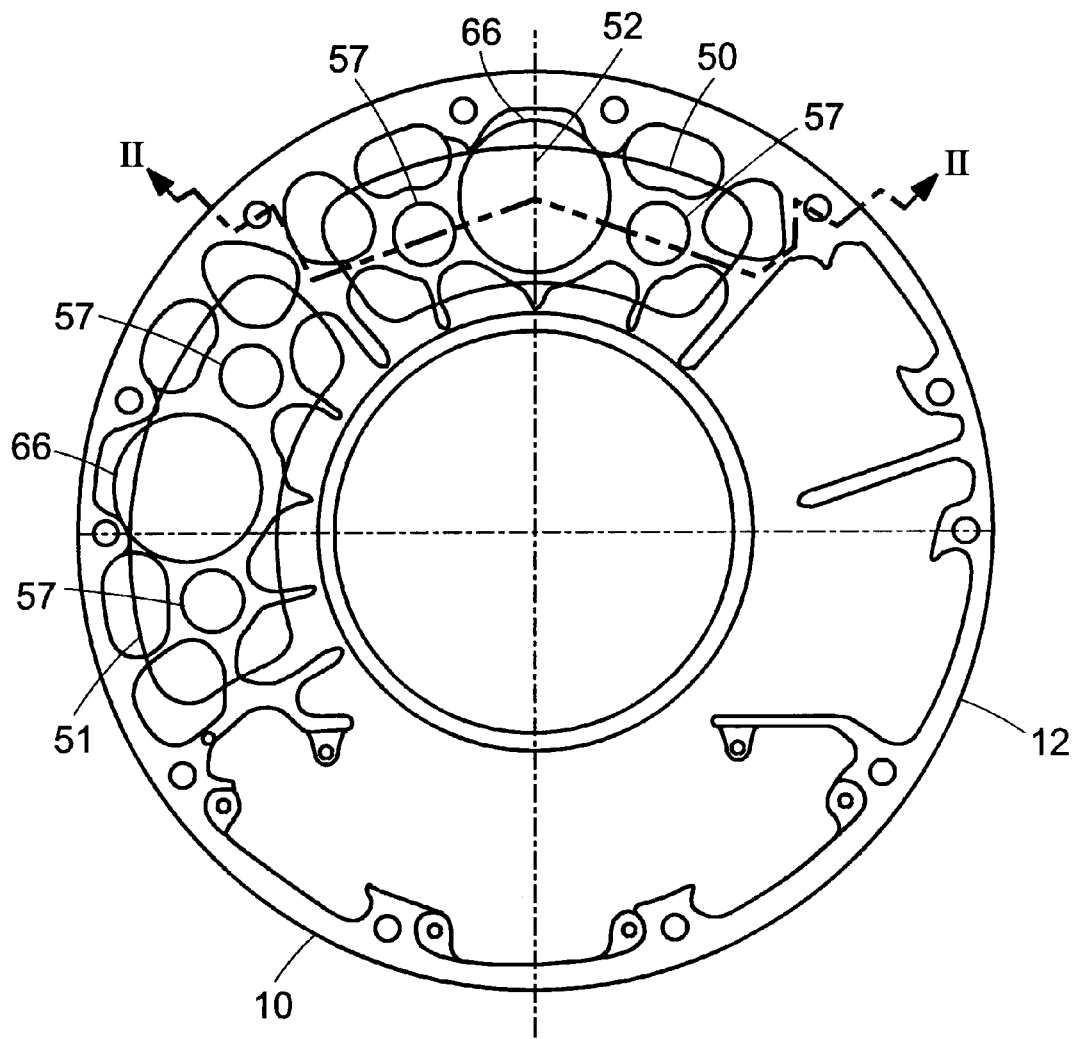
FIG. 1 is a schematic plan layout view of a first embodiment of the present invention.

Referring to FIG. 1, a brake assembly 10 is shown in layout form showing the position of the brake pad pairs 50, 51 circumferentially around the brake disc rotor 23. The assembly 10 includes a stationary brake assembly housing 12 surrounding an end of a rotating shaft (not shown) to be braked, the configuration of which is similar to that shown in FIGS. 3 and 4. The first brake pad pair 50 is located spanning a vertical centre line 52 of the brake assembly housing 12 and the second brake pad pair 51 is located rearwardly of the first relative to the forward rotation direction of the disc rotor 23. It should of course be appreciated that the present invention is not limited to any number of brake pad pairs or to the particular configuration shown in FIG. 1.

Figure 2:
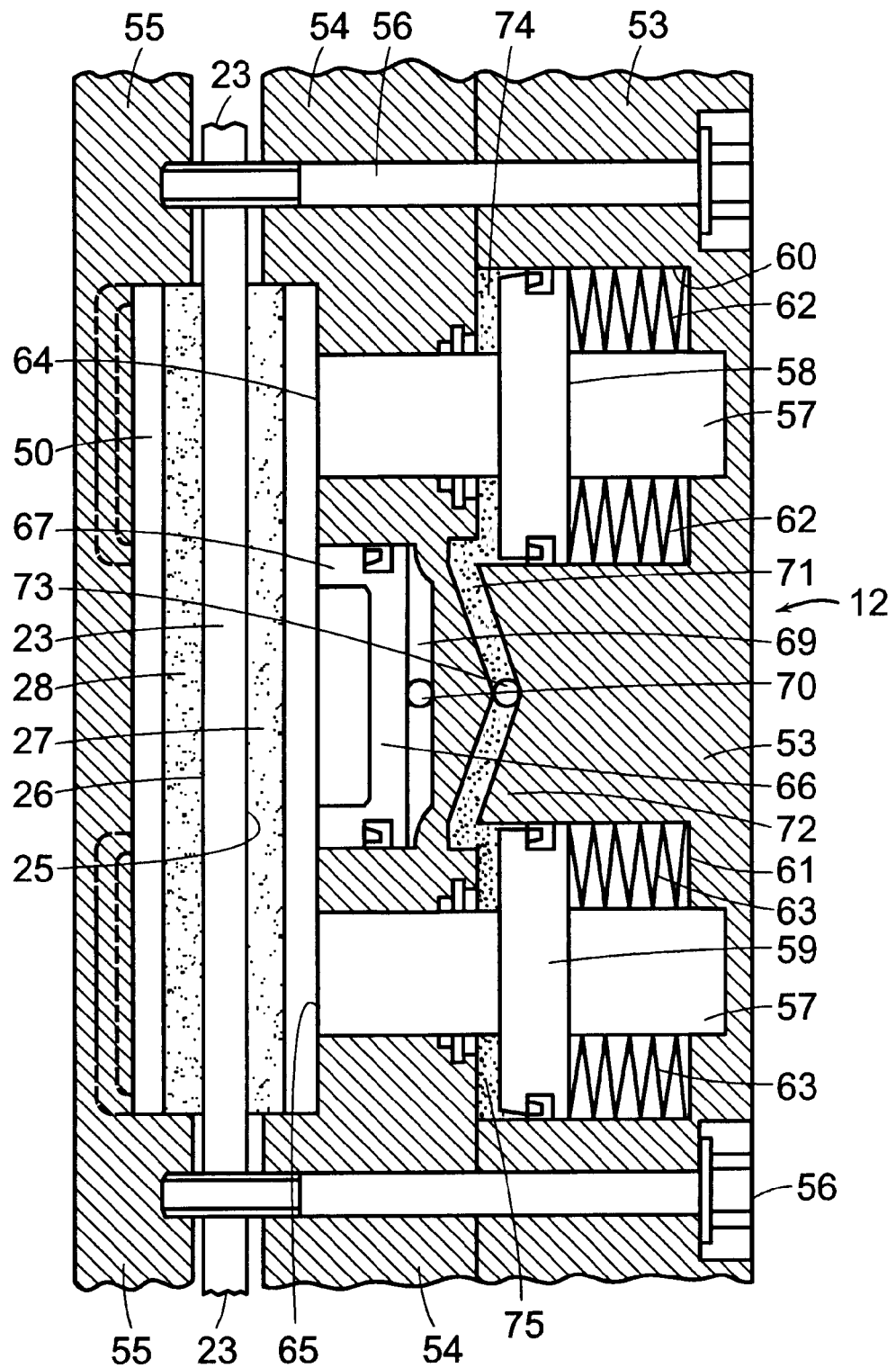
FIG. 2 is a section view taken along line II—II of FIG. 1.

Referring to FIG. 2, the housing 12 is made up of three housing sections 53, 54 and 55 bolted together by a series of bolts 56. The disc rotor 23 is positioned between housing sections 54 and 55 and rotates freely therebetween until acted upon by the brake pad pair 50 comprised of friction pads 27 and 28. The pads 27, 28 act on braking surfaces 25, 26 of the rotor disc 23.

First activating means 57 comprising a. pair of spaced piston members 58, 59 are provided located substantially within spaced bores 60, 61 in the housing section 53. Suitably rated spring elements 62, 63 act on the piston members 58, 59 to urge free surfaces 64, 65 of same against the friction pad 27. The constant force supplied by spring elements 62, 63 would normally provide a park or emergency braking effect on the rotor 23. A second activating means 66 in the form of a piston 67 within a space 69 located generally between the piston members 58, 59 in the housing section 54. The piston 67 also acts on the friction pad 27 via pressurised hydraulic fluid supplied to space 69 via access passage means 70. A third means 71 is provided to normally counteract the forces supplied by spring elements 62, 63. The third means 71 comprises a space 72 located between housing sections 53, 54 and selectively supplied with pressurised hydraulic fluid via passage means 73, the space 72 communicating with spaces 74, 75 so that the pressurised fluid pushes piston members 58, 59 rearwardly against the spring elements 62, 63.

Operation of the brake assembly is as follows. Firstly, if no pressurized fluid is supplied via passages 70, 73, the piston members 58, 59 are essentially free to move under forces supplied by the spring elements 62, 63. In this mode, the spring elements 62, 63 urge the piston members 58, 59 to the left (in the drawing) so as to force friction pad 27 against the rotor disc 23. The rotor disc 23 may also be mounted on a spline connection 24 so as to be capable of axial movement whereby movement of the pad 27 causes movement of the rotor disc 23 and consequent braking effect by the second pad 28 of the pair of pads. In this mode, the spring elements 62, 63 provide a park brake facility. To provide service braking, pressurised fluid is supplied to the space 72 to counter the forces applied by the spring elements 62, 63. Thereafter service braking is achieved by selectively applying pressurised fluid to the chamber 30 so as to move or release the friction pad 27 from the braking surface of the rotor disc 23. It will be appreciated that the friction pads 27, 28 disclosed in this embodiment and elsewhere through the specification may advantageously be constructed as described in Australian Patent No. 659227 or International Application No. PCT/AU95/00529 but that this is not essential for the performance of this invention. The arrangements described above provide effective fail safe emergency/park type braking by providing a force on the friction pads 27 via the spring elements 62, 63 and the piston members 58, 59 in the event of a failure of the hydraulic fluid system.

Figure 3:
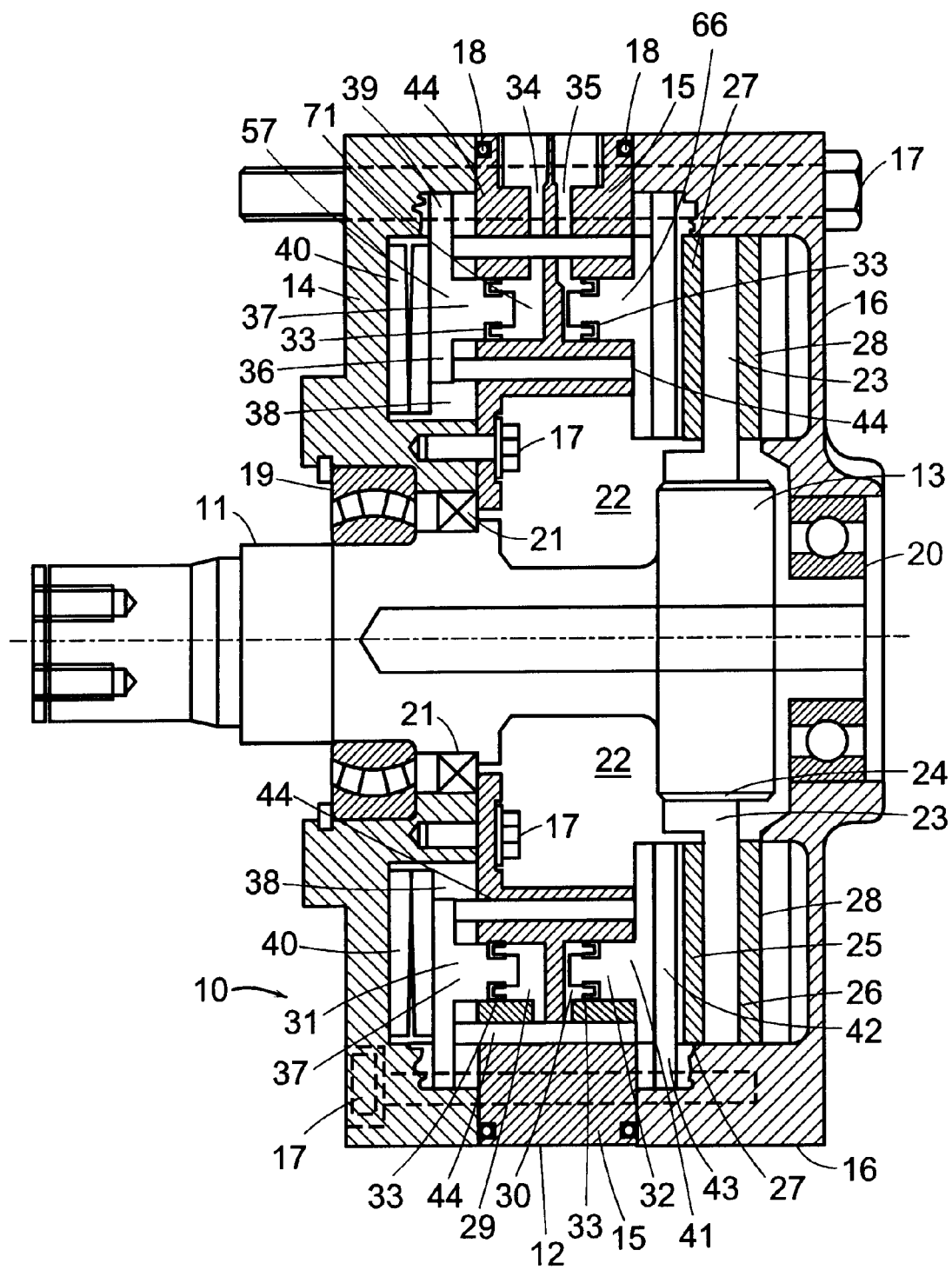
FIG. 3 is a schematic cross-sectional view of a second preferred embodiment of the present invention.

Referring. now to FIG. 3, a second embodiment of a brake assembly 10 is shown surrounding a rotatable shaft 11 to be braked. A stationary brake assembly housing 12 surrounds the shaft end 13 and is made up of three sections 14, 15 and 16 bolted together by a number of bolts 17 and sealed by annular seals 18. The shaft 11 is supported within the housing 12 via a pair of bearings 19, 20. Furthermore, a seal 21 is provided between the shaft 11 and the housing section 14 so as to provide an enclosed space 22 between the shaft end 13 and the housing 12. By this arrangement, the housing 12 is adapted to maintain a pool of liquid as described, for example, in co-pending International Patent Application No. PCT/AU95/00529. The level of the liquid pool would normally be no higher than the level of the seal 21.

Within the enclosed space 22, a disc rotor 23 is provided connected to the shaft 11 by a spline connection 24 so as to allow the disc rotor 23 to move axially relative to the shaft 11. The disc rotor 23 has a pair of opposed annular braking surfaces 25, 26 adapted to be engaged by friction pad pairs 50, 51 each comprising a pair of friction pads 27, 28. The pads 27 are mounted in the housing section 16 such that they will not move and braking effect with these pads is achieved by the disc rotor brake moving against the pad. Conveniently, two such pairs of friction pads 27, 28 are provided generally diametrically opposed and generally in a horizontal plane.

Arranged within the central housing section 15 is a pair of opposed annular chambers 29, 30 in which annular pistons 31, 32 are located. Annular seals 33 are provided between the annular piston walls and the adjacent chamber walls so as to create a hydraulic chamber whereby pressurised fluid supplied to the chambers 29, 30 will cause the annular pistons 31, 32 to move axially away from one another. Similarly, removal of pressurised fluid from these chambers will enable the pistons 31, 32 to move axially inwardly under externally applied forces. Pressurised hydraulic fluid may be supplied or withdrawn through passages 34, 35. The first annular piston 31 has an annular plate section 36 located outwardly of the housing section 15 and an annular piston region 37 located within the chamber 29 in the housing section 15. The main part of the plate section 36 is located within an annular cavity 38 formed in the housing section 14 but the plate section 36 includes one or more extension sections 39 adapted to slide in recesses in the housing section 14 extending outwardly of the cavity 38 so as to prevent rotation of the piston 31 while permitting axial movement of same. Housed within the cavity 38 are spring means 40 adapted to provide a substantially constant axial force to the piston 31 to urge the plate section 36 of same towards the housing section 15. The spring means 40 may. comprise belville washers as illustrated or any other spring element or the like. The second annular piston 32 is similarly formed by an annular piston section 41, an outer annular plate section 42 and radial extension parts 43 arranged to prevent rotation of the piston 32 while permitting axial movement of same. The friction pads 27 are secured to the plate section 42 so that a friction material surface of same is presented towards the braking surface 25 of the disc rotor 23. Finally, a series of push rods 44 are provided slidably in axially directed holes in the housing section 15 such that the ends of the push rods are adapted to engage inwardly facing surfaces of the plate sections 36 and 42 of the annular pistons 31, 32.

The piston 31 together with piston 32 and push rods 44 acted on by the springs 40 form a first brake activating means 57 to provide a park or emergency brake facility. The second piston 32 together with the means 30 for selectively supplying pressurised fluid thereagainst provides a second brake activating means 66 to provide a service brake facility. A third means 71 is provided via chamber 29 together with the supply of pressurised fluid thereto to counteract the forces supplied by the springs 40.

Figure 4:
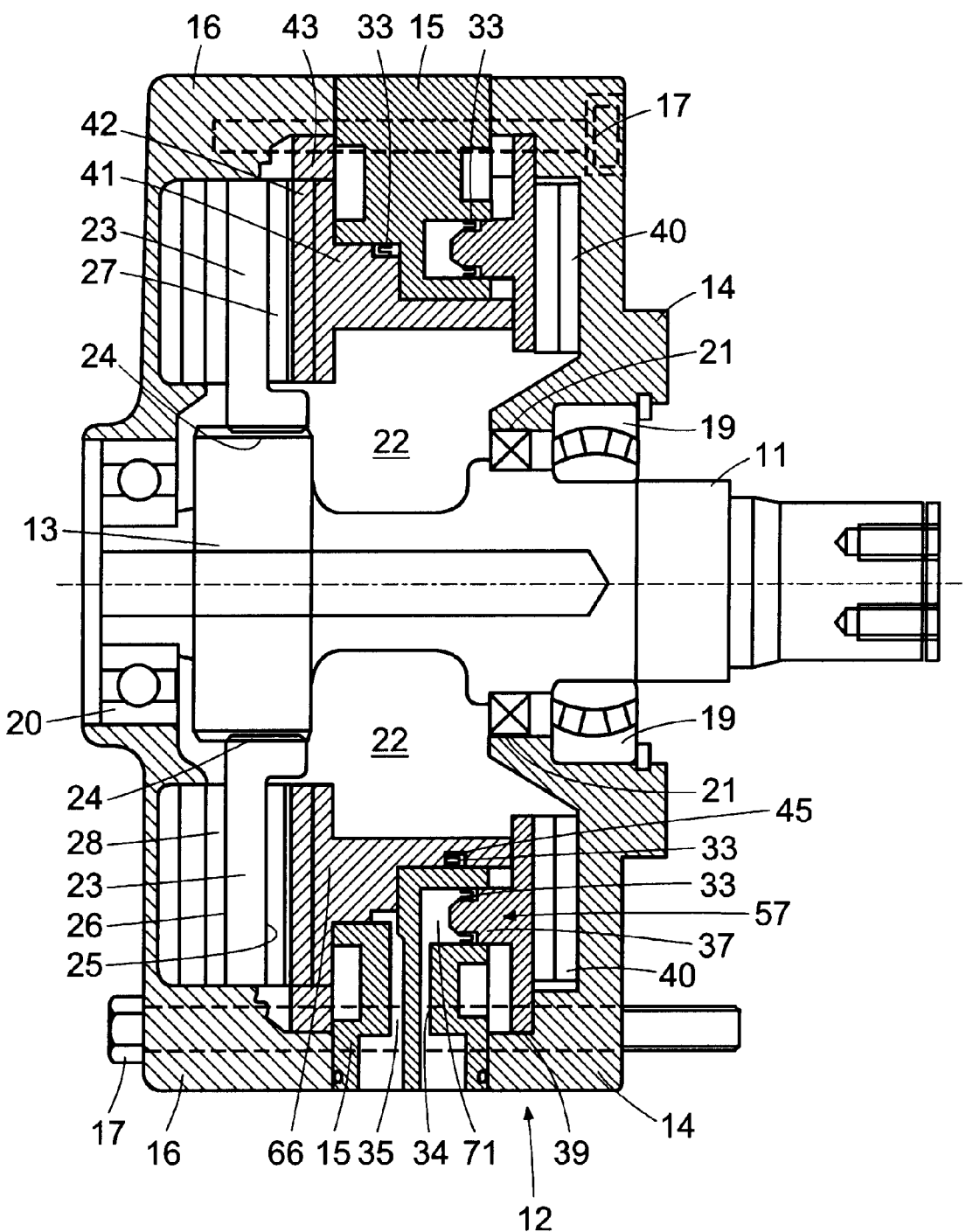
FIG. 4 is a schematic cross-sectional view of a third preferred embodiment of the present invention.

Operation of the brake assembly is as follows. Firstly, if no pressurized fluid is supplied through passages 34, 35, the pistons 31, 32 are essentially free to move under forces supplied by the spring means 40. In this mode, the spring means 40 urges the piston 31 to the right in the drawing and the push rods 44 similarly urge the piston 32 to the right so as to force the friction pads 27 against the rotor disc 23. The rotor disc 23 also moves in the spline connection 24 so as to also create a braking effect between the friction pads 28 and the rotor disc 23. In this mode, the spring means provide a park brake facility. To provide service braking, pressurised fluid is supplied to the chamber 29 to counter the forces applied by the spring means 40. Thereafter, service braking is achieved by selectively applying pressurised fluid to the chamber 30 so as to move or release the friction pads 27 from the braking surface of the rotor disc 23. FIG. 4 illustrates a possible alternative arrangement to that which is illustrated and described above with reference to FIG. 3. Like features have been given the same reference numbers. In the embodiment of FIG. 4, the push rods 44 have been omitted. In the embodiment of FIG. 4, urging forces from the spring means 40 is transmitted via the piston 37 to an extended annular rim section 45 of the piston 41 so as to force the friction pads, 27 against the rotor disc 23. Otherwise, operation of the arrangement shown in FIG. 4 is similar to FIG. 3 as described above.

The arrangements described above with reference to FIGS. 3 and 4 also provide effective fail safe emergency/park type braking by providing a force on the friction pads 27 via the spring means 40, the piston arrangements 31 or 57, the push rod members and the piston members 32 or 66 in the event of a failure of the hydraulic fluid system.

What is claimed is:

1. A brake arrangement including a rotatable disc rotor, at least one friction member adapted for movement towards a braking surface of the disc rotor to provide a braking effect thereon, first brake activating means including first piston means mechanically operable to urge said one friction member towards said braking surface of the disc rotor, second brake activating means including second piston means acting along a first axis and a pressurized hydraulic fluid to provide a service brake facility to urge said one friction member towards said braking surface of the disc rotor, said first brake activating means including individual cylinders located on either side of a central cylinder receiving said second piston means to transmit an urging force to said at least one friction member, the first piston means having spaced second axes along which activation of said first brake activating means occurs, and third means when operational acting to prevent said mechanically operable first brake activating means from urging said one friction member towards said braking surface of the disc rotor, said one friction member being an individual friction pad, said first piston means being selectively operable and independent of said second piston means and said first axis and said second axes being laterally displaced from each other whereby upon deactivation of said third means, said first brake activating means provides a park brake facility, and upon failure of the third means and the second brake activating means, said first brake activating means provides an emergency brake facility, in each case by mechanically urging said one friction pad towards said braking surface of the disc rotor.

2. A brake arrangement according to claim 1, characterized in that at least two said individual friction pads are arranged in a cooperating pair and said rotatable disc rotor is mounted for axial movement relative to said friction pads.

3. A brake arrangement according to claim 2, characterized in that at least two said pairs of friction pads are provided.

4. A brake arrangement according to claim 1, characterized in that said first brake activating means is adapted to provide a substantially constant force.

5. A brake arrangement according to claim 4, characterized in that the substantially constant force provided by said first brake activating means is created by spring means.

6. A brake arrangement according to any one of claims 1 to 5, characterized in that said third means includes a pressurised fluid selectably supplied to the first piston means to produce a counter force to said first brake activating means.

7. A brake arrangement according to claim 1, characterized in that said third means includes a pressurised fluid selectably supplied to the first piston means, said first piston means operating in at least two said individual cylinders.

8. A brake arrangement according to claim 1, characterized in that said individual cylinders receiving said first piston means are located separately and are operable independently relative to the central cylinder receiving said second piston means.

9. A brake arrangement including a rotatable disc rotor, at least one friction pad, with each said friction pad occupying a limited circumferential region of said disc rotor and being arranged for movement towards a braking surface of the disc rotor to provide a braking effect thereon, a first piston member operable in a first cylinder and acting either directly or indirectly on the one friction pad by means of a spring loading force to provide a park brake facility, a second piston member operable in a second cylinder spaced laterally from said first cylinder with said second piston means acting directly or indirectly on the one friction pad to provide a service brake facility, and third means normally acting to prevent said first piston member from providing said spring loading force to said one friction pad, said second piston means being selectively operable independently of said first piston member whereby upon failure of said third means and a pressurised fluid supply to said second piston means, said first piston member by means of the spring loading force without external intervention provides an emergency brake facility by urging said one friction pad towards said braking surface of the disc rotor.

10. A brake arrangement according to claim 9, characterized in that the third means is pressurised fluid introduced into said first cylinder and acting on said first piston member in a direction opposite to said spring loading force.

11. A brake arrangement according to claim 10, characterized in that two said first cylinders are provided, with respective said first cylinders being located on opposite sides of said second cylinder, said pressurised fluid forming said third means being introduced through a common source into both said first cylinders.

* * * * *